US006820074B1

(12) United States Patent
Simpson

(10) Patent No.: US 6,820,074 B1
(45) Date of Patent: Nov. 16, 2004

(54) NULL-LINE BASED RADIAL INTERPOLATION OF GRIDDED DATA

(75) Inventor: Anne L. Simpson, Houston, TX (US)

(73) Assignee: Landmark Graphics Corporation, Houston, TX (US)

(*) Notice: Subject to any disclaimer, the term of this patent is extended or adjusted under 35 U.S.C. 154(b) by 0 days.

(21) Appl. No.: 09/348,971

(22) Filed: Jul. 7, 1999

Related U.S. Application Data

(60) Provisional application No. 60/092,387, filed on Jul. 10, 1998.

(51) Int. Cl.[7] .............................................. G06F 17/30
(52) U.S. Cl. ........................ 707/3; 707/104.1; 702/14; 702/16; 708/290; 708/514
(58) Field of Search .............................. 702/13–14, 15, 702/16–17; 708/290, 514; 707/1–10, 100–104, 104.1, 2–3; 700/90

(56) References Cited

U.S. PATENT DOCUMENTS

| | | | |
|---|---|---|---|
| 4,031,369 A | | 6/1977 | Heaman et al. |
| 4,449,196 A | | 5/1984 | Pritchard |
| 4,679,174 A | | 7/1987 | Gelfand |
| 4,727,488 A | * | 2/1988 | Flinchbaugh ................ 702/16 |
| 4,751,655 A | | 6/1988 | Peacock |
| 4,751,655 A | | 6/1988 | Peacock |
| 5,537,320 A | * | 7/1996 | Simpson et al. ............. 702/14 |
| 5,798,923 A | | 8/1998 | Laskowski |
| 5,894,417 A | * | 4/1999 | Dorn ........................... 702/14 |
| 5,924,049 A | * | 7/1999 | Beasley et al. .............. 702/17 |
| 6,240,425 B1 | * | 5/2001 | Naughton ................ 707/104.1 |
| 6,263,284 B1 | * | 7/2001 | Crider et al. ................. 702/14 |
| 6,446,060 B1 | * | 9/2002 | Bergman et al. ............... 707/3 |

OTHER PUBLICATIONS

Anne Simpson, A Utility for Filling Seis Works Horizons, Mar./Apr. 1996, 7 pages.*
Simpson, A., *A Utility for Filling SeisWorks Horizons*, Technical Newsletter for Landmark Users, Mar./Apr. 1996, pp 18–22, Landmark Graphics Corporation.
Nemeth, T., et al. "Least–Squares Migration of Incomplete Reflection Data." Geophysics, Jan.–Feb. 1999, Soc. Exploration Geophysicsts, USA, vol. 64, No. 1, pp 208–221.
Jinming, Zhu, et al. "Implicit Interpolation in Reverse–Time Migration" Geophysics, May–Jun. 1997. Soc. Exploration Geophysicists, USA, vol. 62, No. 3, pp 906–917.
Ivakhnenko, A. G., et al: "Three–Stage Structural Identification of Complex Spatial Objects." Avtomatika, Jul.–Aug. 1977, Ukraiainian SSR, USSR, vol. 10, No. 4, pp 16–22, XP001012531.

* cited by examiner

*Primary Examiner*—Shahid Alam
*Assistant Examiner*—Jean Bolte Fleurantin
(74) *Attorney, Agent, or Firm*—Gary L. Bush; Andrews Kurth LLP

(57) ABSTRACT

A method and software are disclosed for processing data values of a data array at equally spaced locations in two dimensions where the desired data values are nulls in the data array. The method and software first searches for linear ranges of contiguous nulls, and then performs incidental interpolation of all points in such range.

1 Claim, 9 Drawing Sheets

(7 of 9 Drawing Sheet(s) Filed in Color)

US 6,820,074 B1

NULL-LINE BASED RADIAL INTERPOLATION OF GRIDDED DATA

REFERENCE TO RELATED APPLICATION

This application claims priority from Provisional Application Ser. No. 60/092,387 filed on Jul. 10, 1998.

Reference to Computer Program Listing Appendix. A computer program listing is provided on a compact disk attached hereto and the subject matter of compact disk is incorporated by reference. The total number of compact disks is two (including duplicate). The files on the disks are as follows:

Code Listings
SurfaceFill.h
SurfaceFill.c
InterpSurf.c
Askfloat.c
Askint.c
ConvexHull.c
CroutD.c
D2strf.c
Epsilon.c
ErrControl.c
Floatin.c
Interrupt.c
Intin.c
L2strc.c
LineDraw.c
MatInv2x2.c
PolygonFill.c
SortIndexD.c
SortIndexF.c
Str2dc.
Str2lc.c
Strin.c
Stropa.c
Strout.c
Yesno.c

BACKGROUND OF THE INVENTION

1. Field of the Invention

This invention relates generally to the field of methods for processing data with values at equally spaced locations in two dimensions, particularly geologic horizon data inferred from seismic information. In particular the invention concerns interpolation of data values at locations where the desired data values are missing or "null".

2. Description of the Prior Art

Prior methods for interpolation of data values at "null" locations have estimated what the data value should be at a null location based on nearby valid (non-null) data which are found by scanning radially outwards from the null location in a fixed set of directions. Each of these nearby valid data values contributes an estimate or projection of what the data value should be at the null position. The final data value assigned to the null position is a weighted average of these individual projections where the weighting for each projection is designed to diminish with increasing distance of the valid data from the null position.

The prior implementation of this interpolation method has been called "null-point based", because the method searches for a point in the two dimensional grid where interpolation is required (i.e., a null location in the grid) and performs all the steps necessary to produce the interpolated estimate at that null point location, and then moves on to search for the next null-point where interpolation is required. Prior implementations of null-point based methods have been called "Linear Interpolation".

For cases involving large numbers of contiguous nulls, the prior interpolation has required a great number of calculations and increased computer time to perform them. In such cases most of the computational work is concentrated on the scanning for valid neighbors.

Identification of Objects of the Invention

A primary object of this invention is to provide an improved method for interpolation of null points in two dimensional gridded data, such as geologic horizon data inferred from seismic information, where such improved method will be referred to as Spatial Interpolation based upon radial scan interpolation methods;

An important objective of the invention is to provide an improved method where the improvement is in greatly reduced computation time, yet produces identical value interpolations as does the prior method.

Another important objective of the invention is to minimize the scanning steps required of the prior art method with an improvement in computational speed by factors of four or five or more.

SUMMARY OF THE INVENTION

The objects identified above as well as other features and advantages are incorporated in the null-line based method of the invention. According to the invention, the method, embodied in a stored computer program, searches for every linear range of contiguous nulls in various scan directions, performing for each null-line found calculations at all null points on the line in a fast recursive fashion, accumulating partial results in two intermediate arrays. After calculations for the last null-line are completed, the final interpolations are found by simple division of elements of one of the intermediate arrays by corresponding elements of the other.

The interpolations obtained by null-line based interpolation are mathematically identical to those obtained by null-point based interpolation. The difference is in the amount of work required, especially for cases involving large numbers of contiguous nulls. In such cases most of the computational work is concentrated on the scanning for valid neighbors. The null-line based approach is designed to minimize such scanning. In applications to the interpolation of gridded seismic horizon data, experience has shown computational speed improvements by factors of four or five or more, in comparing the two methods of implementation.

BRIEF DESCRIPTION OF THE DRAWINGS

The patent or application file contains at least one drawing executed in color. Copies of this patent with color drawing(s) will be provided by the Patent and Trademark Office upon request and payment of necessary fee.

The objects, advantages and features of the invention will become more apparent by reference to the drawings which are appended hereto and wherein an illustrative embodiment of the invention is shown, of which.

DESCRIPTION OF THE INVENTION

Figure 1:
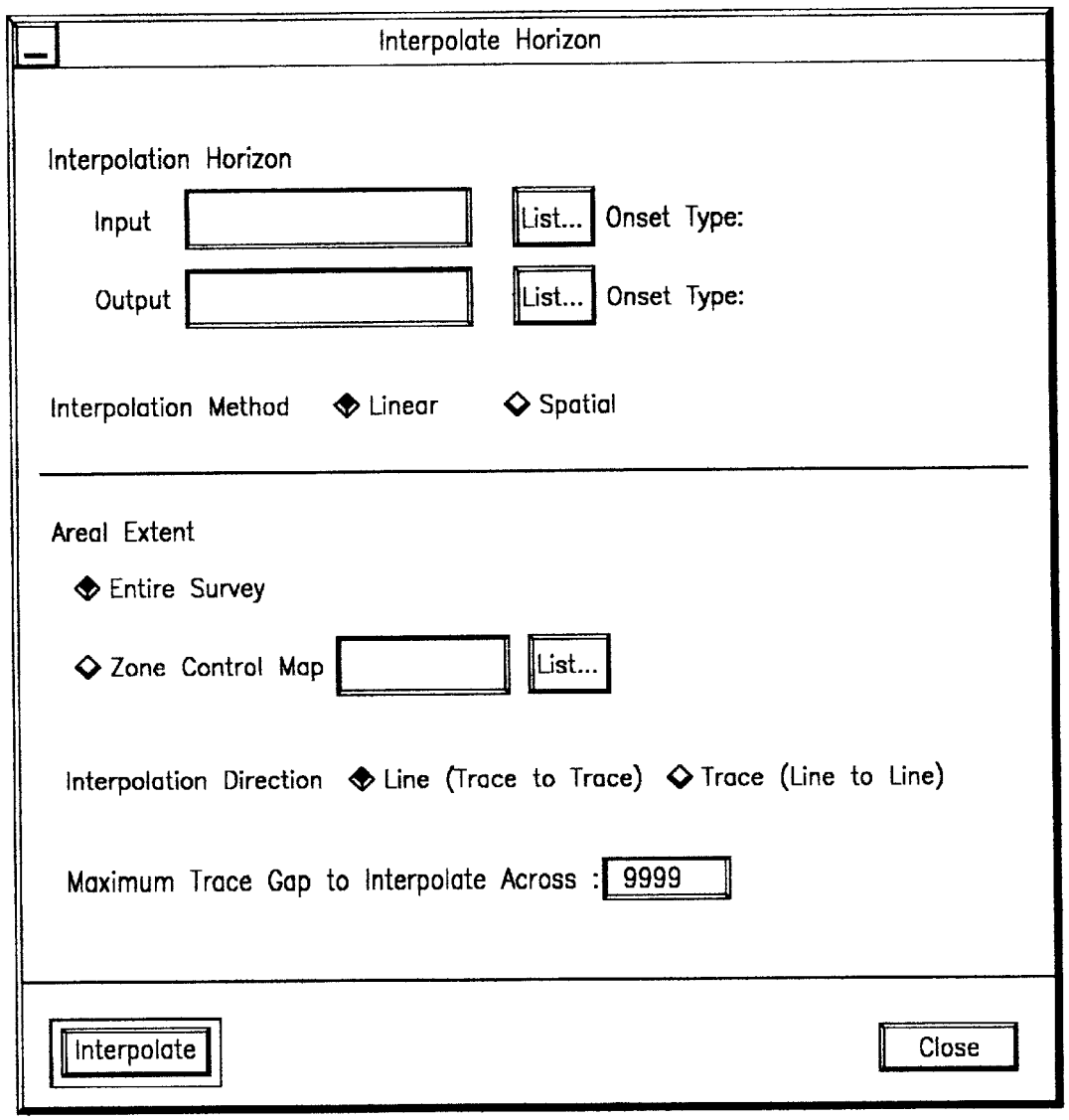
FIG. 1 illustrates a first interface screen between a user of the software which embodies the invention, where the interface screen allows inputs of program parameters.

A process developed for "filling" null positions of incomplete horizons with interpolated values was described in an article "A Utility for Filling SeisWorks Horizons" in the March/April 1996 issue of UserNet, (a Landmark Graphics Corporation publication) with enhancements described in "HorizonFill Utility Modified for Fault and Interpolation Polygons" in the May/June 1996 UserNet. HorizonFill inputs an ASCII file containing an exported SeisWorks horizon and outputs a filled horizon into a second ASCII file to be imported back into SeisWorks. Executable files of the utility have been made available from a Landmark Graphics website, and hundreds of people around the world downloaded it. That process, after a significant number of further modifications, has now been incorporated directly into SeisWorks 4.0 as a user-selectable alternative to the presently available horizon interpolation function.

To distinguish among these various functions, the term "Linear Interpolation" is used here for the previously available SeisWorks function (since its interpolation is based on the two nearest neighbor valid data along a straight line through the interpolation point), "Spatial Interpolation" is used for the new SeisWorks alternative of this invention (since its interpolation is based on nearest samples at multiple spatial angles relative to the interpolation point), and "HorizonFill Interpolation" is used for interpolation as described in the above-cited UserNet articles (where interpolation is based on nearest samples in multiple angular ranges rather than in specific directions).

Spatial Interpolation of this invention is designed to be a natural extension of Linear Interpolation, and produces a superior basic result at an added cost in computation time much less than that which would be incurred in implementing the full HorizonFill algorithm. Additional features available in Spatial Interpolation but not in Linear Interpolation, such as extrapolation capability, interpolations out to the convex hull of the data, extreme attention to detail around faults, and a built-in smoothing filter, enable further enhancements to the appearance and usefulness of resulting horizons.

Points of Interpolation

Interpolation takes place at points in an index space, i.e., line index and trace index, points for which the horizon Z coordinate is null, under control of one or more boundary polygons and zero or more fault polygons. A boundary polygon may be the entire index space, the extent box of the non-null data, the convex hull polygon of the non-null data, or may be defined by arbitrary user-specified polygon(s). If a null point is inside of any boundary polygon and outside of every fault polygon, then interpolation will be attempted at that point. Every point which is inside of a fault polygon will be forced null whether or not it was originally null.

Scanning for Neighbor Points

At each interpolation point either four (quadrant scan) or eight (octant scan) near neighbor non-null data points are sought. For quadrant scanning, nearest neighbors are sought straight to the left, straight to the right, straight upwards, and straight downwards. Octant scanning uses these four plus nearest neighbors at 45 degrees up to the left, 45 degrees up to the right, 45 degrees down to the left, and 45 degrees down to the right.

This differs from the HorizonFill scanning, in that HorizonFill makes an exhaustive scan for nearest neighbor in eight angular ranges 0–45 degrees, 45–90 degrees, . . . 315–360 degrees. Such scanning is much more time consuming than the spatial scanning described above. This extra expense can be justified for extremely sparse data, but will generally not be justified for seismic horizon data from 2D horizon trackers, or from collections of 1D trackings.

Under Linear Interpolation scanning nearest neighbors are sought straight to the left and straight to the right, or straight upwards and straight downwards. Thus, quadrant scanning under Spatial Interpolation is roughly equivalent to running both options of Linear Interpolation and then averaging the two results.

Weighting of Neighbor Points

The interpolated value will be a weighted average of the projections of the near neighbor points back to the point of interpolation. The weighting for each neighbor point is based on its distance from the interpolation point, and on whether or not the straight line path between those two points crosses a fault. Normal weighting is proportional to reciprocal distance. If a fault is crossed, normal weighting is divided by 100. This downgrades the influence of such neighbor points under normal conditions, without preventing interpolation at null points completely surrounded by faults.

Estimation of Gradients

The horizon is a function $Z(i,j)$ whose gradients are required in the projection of each neighbor point back to the interpolation point. Spatial Interpolation enables two methods for estimation of these gradients. In one method a plane is fit to the valid horizon data using least squares, and the two partial derivatives are read from this plane and are constant at all i,j positions. In the other method, a quadratic surface is fit to the valid horizon data using least squares, and the two partial derivatives become linear functions of i and j.

Projection to Point of Interpolation

For each valid neighbor point, its weight value is computed as described above. Then, using the gradient at the neighbor point, the directional derivative is computed from the neighbor to the interpolation point and uses this to project the Z coordinate of the neighbor point back to the interpolation point. The weighted average of these projections is taken as the interpolation. Consequently, as long as at least one near neighbor is found, then an interpolation (or extrapolation) will be made.

Smoothing Filter

When interpolation is completed, an option is provided for passing over the data with a smoothing filter. This filter convolves a square, symmetrical, odd-size array of coefficients with the interpolated horizon, presently containing original and interpolated data points plus null points inside faults, outside prescribed boundaries, and wherever interpolation may have failed.

If M is the requested half size of this filter, then the program according to the method of the invention first generates 1+2M points on the symmetrical cosinusoidal curve C(m)=0.5*(1+cos(m*K)) m=−M . . . M, where K=2pi/(M+1); then creates the array filter coefficients as the set product of this curve with itself $$F(m,n)=C(m)*C(n) \ -M<=m<=M \ -M<=n<=M$$

Convolution of this array with the data is complicated by: 1) the need to use as inputs only the irregularly available non-null data (so that each output position must have its own normalization), 2) the need to produce outputs exactly up to the edges of boundaries and faults, and 3) the need to allow an option as to whether the filter should smooth or should retain the original data points. The convolution can benefit from much of the initialization overhead work already performed for the interpolation computations—which is why filtering is a rather convenient option to add to the interpolation function.

SeisWorks Control Parameters

If, on the top bar of a SeisWorks map view window, a click is made on "HORIZONS", a pull down menu appears including an "Interpolate . . . " option. Clicking that option brings out the "Interpolate Horizon" parameter specification window as shown in FIG. 1. (file IHparamsLinear.gif).

By default this window relates to the Linear Interpolation method, and is the same as the Interpolate Horizon window of prior SeisWorks releases except for the "Interpolation Method" line which has been added, and which shows that "Linear" is the default.

The top two parameters to be specified, the names of the input and output horizons, are the same for both interpolation methods. The remaining parameters shown here (Areal Extent, Interpolation Direction, and Maximum Trace Gap to Interpolate Across) are specific to Linear Interpolation and have self-evident meanings which remain as in prior versions of SeisWorks.

Figure 2:
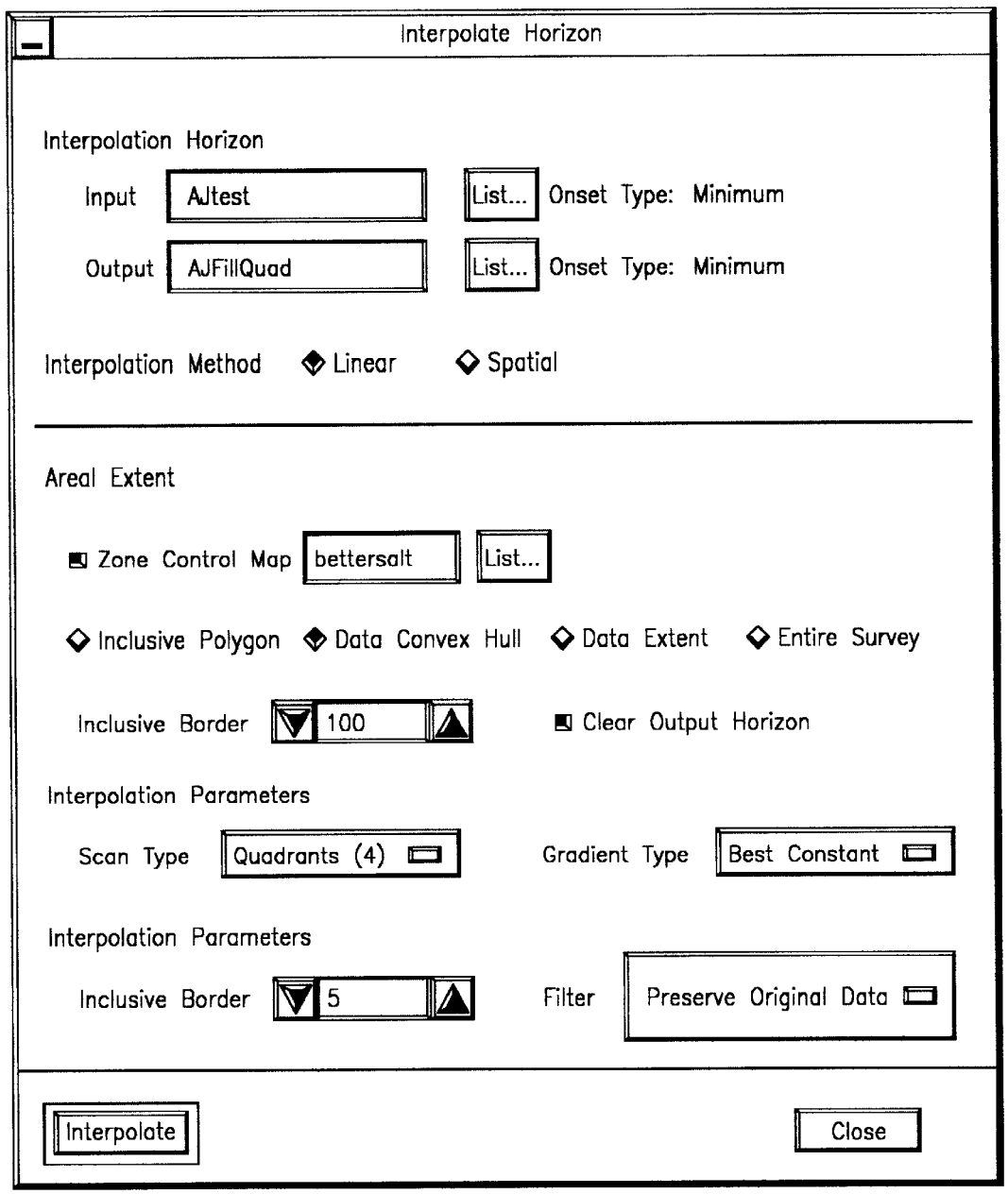
FIG. 2 illustrates a second interface screen which allows input of other program parameters.

When the "Spatial" method of interpolation button is pushed, the window reconfigures itself as shown in FIG. 2. (file IhparamsSpatial.gif), with Spatial-specific parameters now occupying the bottom two-thirds of the window. These are described below.

Areal Extent

Areal extent must define at least one boundary polygon which surrounds the points at which interpolation is to be made. If there is no Zone Control Map specified, the choices will be "Data Convex Hull", "Data Extent", and "Entire Survey", with the default selection being Data Convex Hull. The "Inclusive Polygon" boundary option is disabled in the absence of a Zone Control Map.

If there are faults present, the user must have created them as "exclusive polygons" in a Zone Control Map and must select that map here. Since such a map may also contain one or more "inclusive polygons", specification of such a map will enable the "Inclusive Polygon" option as a boundary choice. However, if inclusive polygon is selected as the boundary and it transpires that no inclusive polygon happens to be defined in the specified Zone Control Map, then an error notification window will appear requiring the user to choose another type of boundary.

Any choice of boundary, such as the entire survey or the data extent box, which is larger than the natural boundary of the data (e.g., the convex hull) is best treated by two-pass processing. In the first pass it is recommended to create a horizon interpolated out to the convex hull, and in the second pass to extend the convex hull interpolation out to the larger boundary. The second pass thus separates out the extrapolations, which will now be computed from the values along the convex hull, some values preexisting, some values interpolated, but forming together a smoothly varying basis for extrapolation. In this two pass scheme, it is recommended to use the "octant" scan pattern described below to provide the best chance of finding at least one neighbor point for each extrapolation, and use the "best linear" gradient to characterize the horizon behavior under extrapolation.

Inclusion Border

The Inclusive Border parameter is a time-saving parameter having meaning when the user has specified one or more inclusive polygons from the Zone Control Map as the boundary for interpolations. In this case the code determines the extent box of the inclusive polygons, enlarges that box in all four directions by the value of the inclusion border, and extracts this subbox of the input array for processing. This saves computation time for interpolations within small areas of huge horizons. In effect it puts a reasonable limit on how far away from the interpolation point the program according to the method of the invention will scan for non-nulls. The default value of 100 is generally adequate.

Clear Output Horizon

The default processing sequence can be characterized by the following steps:

1) Form a scratch array and clear it to all nulls.
2) Form the interpolations and add them plus ALL non-nulls of the input array into the scratch array,
3) Copy the scratch array to the output array.

This sequence is called "Clearing the output horizon" and replacing it with the input plus the interpolations.

Under the alternate choice the sequence can be characterized by the following steps:

1) Form a scratch array and copy into it the specified output array.
2) Form the interpolations and add them plus ONLY those non nulls of the input array which happen to lie within the processing boundary into the scratch array.
3) Copy the scratch array to the output array.

If there is a large zapped horizon "ZAP" which is noticed to be poorly behaved within a small area, and that there is another horizon "PROFILES" containing good 1D trackings of the same horizon over this same small area, then 1) Create an inclusive polygon defining the small area and put it into a Zone Control Map.
2) Set PROFILES as the input horizon.
3) Set ZAP as the output horizon.
4) Select the Zone Control Map.
5) Turn off the "Clear Output Horizon" option.

The (presumably good) interpolations based on the PROFILES data replaces the bad data in ZAP within the inclusion polygon.

Scan Type

The choices offered here are "quadrants" for four directional scanning, and "octants" for eight directional scanning. Octant scanning takes about twice the time required for quadrant scanning. Results are often very similar if extrapolations are not required.

Gradient Type

There are three choices available for type of gradient: zero gradient, best constant gradient derived from fitting a plane to the input data, and best linear gradient derived from fitting a quadratic surface to the input data. Qualitative differences resulting from the choice made will be most noticeable in regions of extrapolation. Computational time differences are insignificant.

Filter Size

The size of the post-interpolation smoothing filter is forced to be one of the odd integers values 1,3,5, . . . 101. Value 1, the default, requests no filtering (technically a 1 by 1 filter is an all-pass delta function). The incrementing and decrementing buttons available for this parameter change value by steps of 2 so as to preserve the odd size requirement for this filter, and these buttons also enforce the range restriction of 1 to 101. If the user manually enters a filter size less than 1 or greater than 101, then the effective value will be changed to 1 or 101 respectively when the "Interpolate" button is pushed. If the user enters an even number in the range 2 to 100 for filter size, then this even value will be rounded up to the next higher odd number when the "Interpolate" button is pushed.

Filter computation time increases as the square of filter size. Very large filter sizes are generally prohibitive (the 101 by 101 filter performs more than ten thousand multiply-adds per output position). If a really large filter, say N by N, is wanted, then k successive applications of a filter of size N/k might be considered.

Preserve Original Data

The second user controllable parameter affecting filter action is a choice between "Preserving Original Data", the default, and filtering "All Data". This latter choice contains a caution that this option "Destroys Original Horizon Data".

Process Monitoring

The progress of the processing is reported to the user in a dialog box with a button enabling the user to abort at any time. This progress is described in phases:

1) Initializing,
2) Percentage completion of basic interpolation,
3) Percentage completion of filtering,
4) Exiting.

EXAMPLES

Interpolations without Use of Faults

Figure 3:
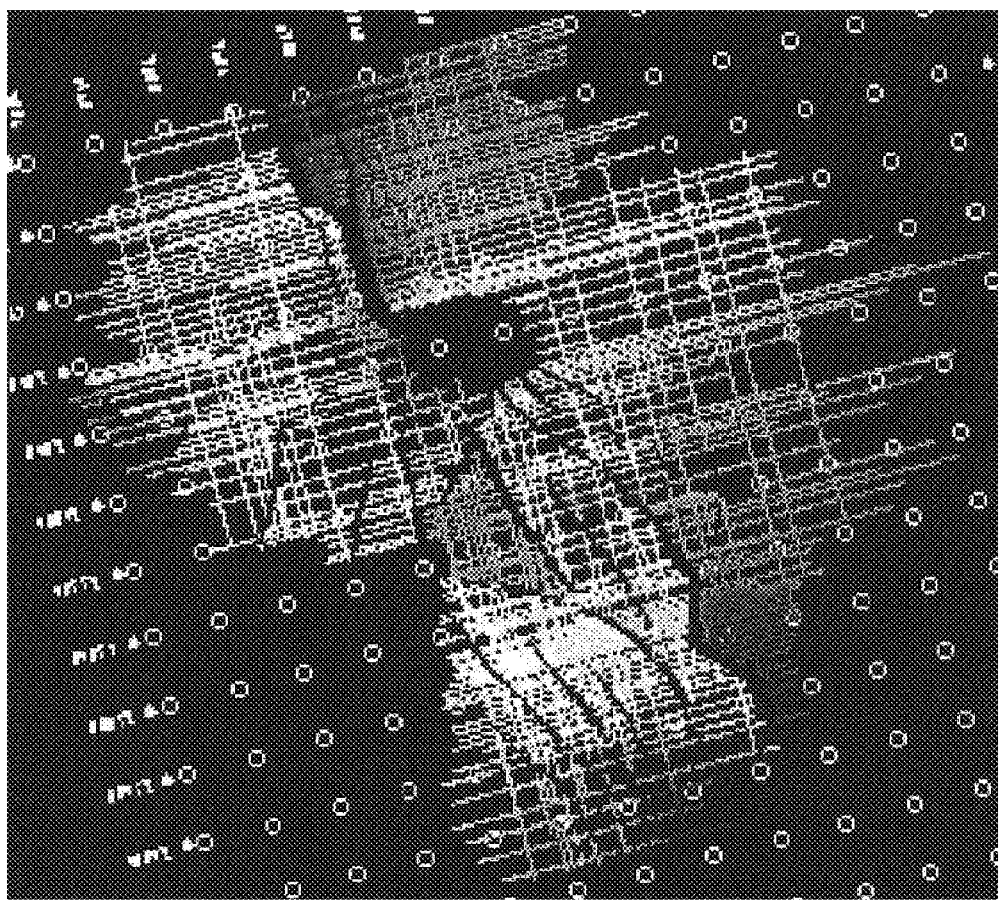
FIG. 3 illustrates gridded two dimensional seismic horizon data for illustrating the interpolation method of this invention.

FIG. 3 (file AjtestC.gif) shows a horizon composed of in line and cross line horizon profiles which are illustrative of input data for examples shown in this specification. A control map with many faults exists for this horizon, but that map is not used in these first interpolations.

Figure 4A:
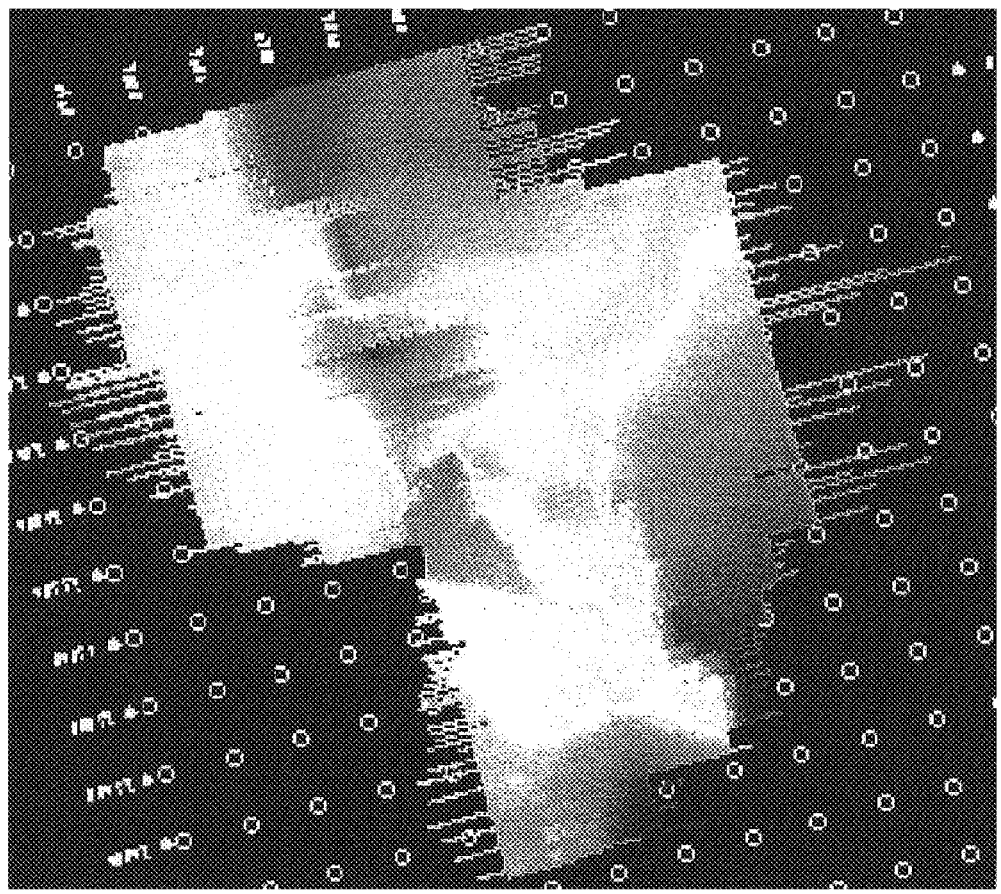
FIG. 4A illustrates the results of (prior art) linear interpolation of the horizon data of FIG. 3 in the line direction, without faults.
Figure 4B:
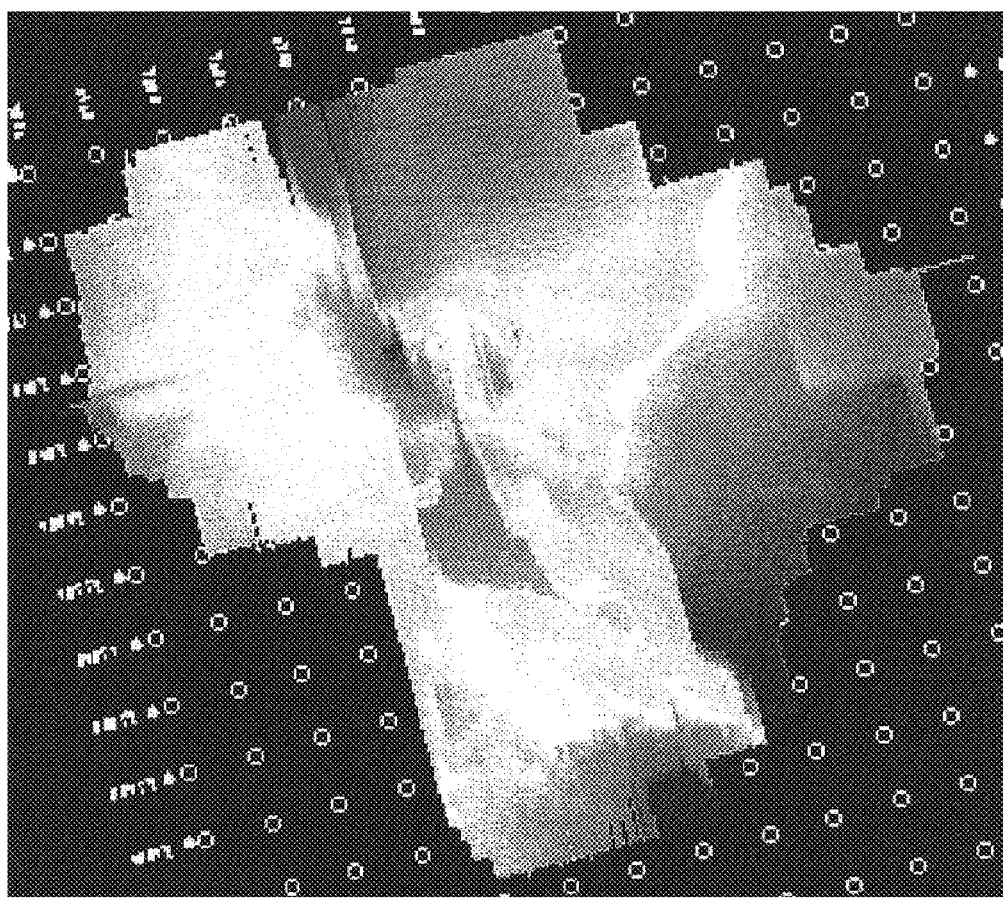
FIG. 4B illustrates the results of (prior art) linear interpolation of the horizon data of FIG. 3 in the trace direction, without faults.
Figure 4C:
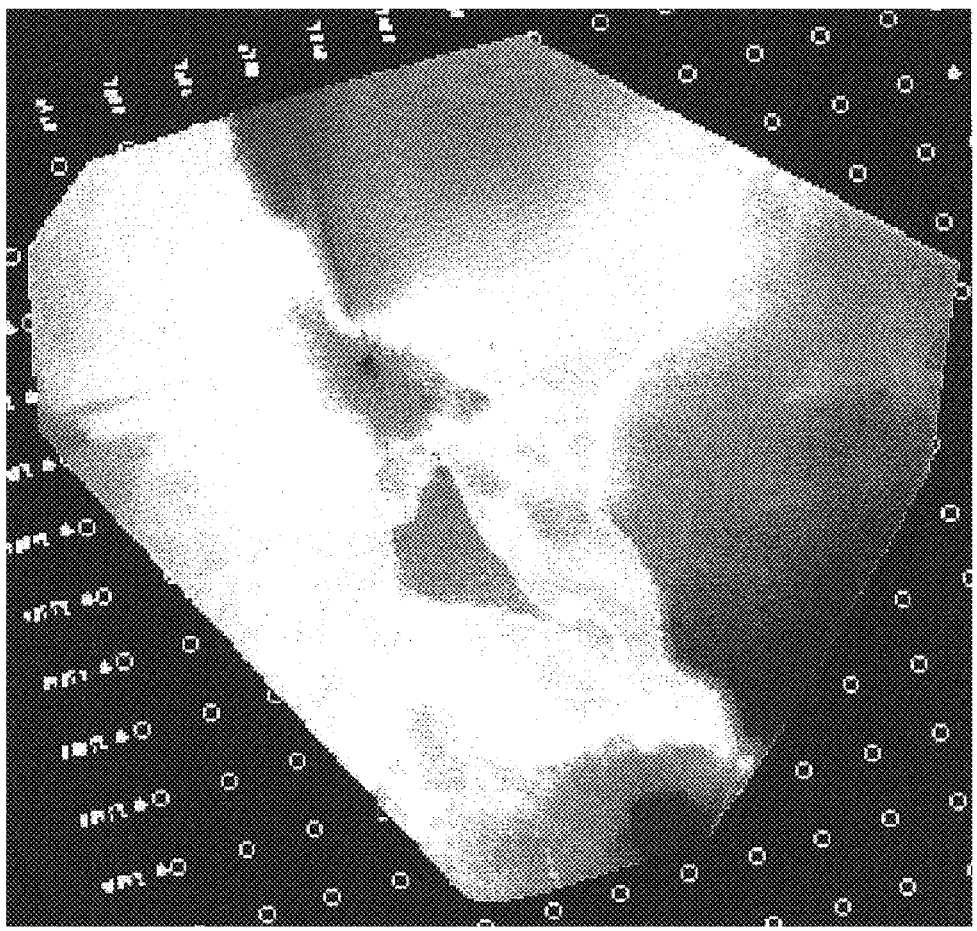
FIG. 4C illustrates the results of spatial interpolation according to the methods of this invention of the FIG. 3 horizon data using quadrant scanning, without faults.

FIG. 4A (file AJFillLineC.gif) shows the results of prior art Linear Interpolation choosing the line direction option. FIG. 4B (file AJFillTraceC.gif) shows the results of Linear Interpolation choosing the trace direction option. FIG. 4C (file AJFillQuadC.gif) shows the results of Spatial Interpolation of this invention using a convex hull boundary and the quadrants scanning option.

The Linear Interpolation results are significantly anisotropic and data dependent. In this case the trace direction option furnishes a significantly more acceptable result, and is closer in appearance to the Spatial Interpolation result.

Interpolations Using Faults

The presence of fault polygons can create additional unpleasant effects under Linear Interpolation, but none under Spatial Interpolation, as is illustrated here where the above interpolations have been rerun utilizing the Zone Control Map for this horizon containing some 40 fault polygons.

Figure 5A:
FIG. 5A shows results of linear interpolation (prior art) of FIG. 3 horizon data in the line direction using fault polygons.
Figure 5B:
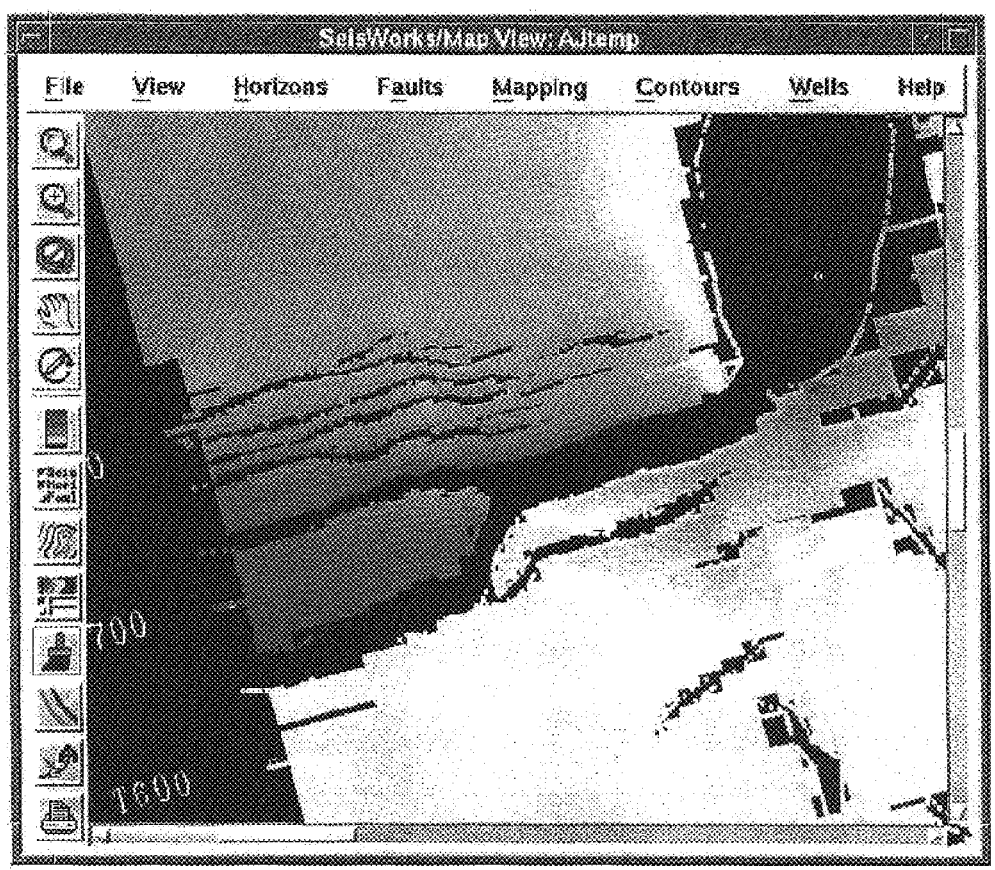
FIG. 5B shows results of linear interpolation (prior art) of FIG. 3 horizon data in the trace direction using fault polygons.
Figure 5C:
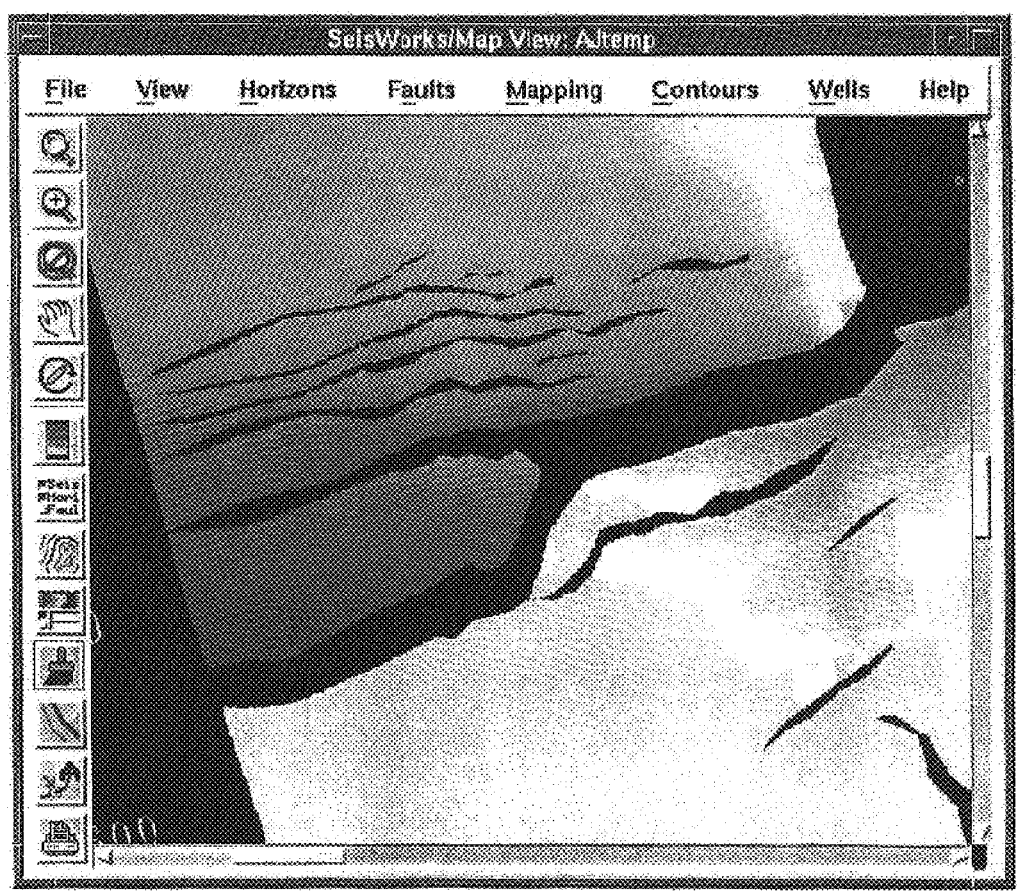
FIG. 5C shows results of spatial interpolation of this invention of FIG. 3 horizon data using quadrant scanning and fault polygons.

FIG. 5A (file AJFillLineFaultB.gif) shows a blowup of a small area from the rerun of Linear Interpolation in the line direction, FIG. 5B (file AJFillTraceFaultB.gif) shows the same small area from rerunning Linear Interpolation in the trace direction, and FIG. 5C (file AJFillQuadFaultB.gif) shows the Spatial Interpolation result of this invention for the same area.

Linear Interpolation in the line direction gives particularly bad results for this data because of the orientation of the long thin faults. Trace direction on Linear Interpolation is noticeably better. But neither can really compare in careful workmanship around the faults to the Spatial Interpolation result of this invention.

The above descriptions of the prior art Linear Interpolation Method and the method of this invention, called Spatial Interpolation are both based upon radial scan interpolation equations. The Linear Interpolation method is based upon a null-point based approach to implementation of radial scan interpolation. The Spatial Interpolation method of this invention is based upon null-line implementation of radial scan interpolation. Description of radial scan equations, the null-point based approach (Linear Interpolation), patterns of radial scanning, null data ranges and their importance, and null-line based interpolation follow.

RADIAL SCAN INTERPOLATION EQUATIONS

In broadest terms the basic equation for radial scan interpolation at position (i,j) in a data grid d(i,j) may be written as follows:

$$V(i,j) = \frac{\underset{t=1}{\overset{T}{\text{SUM}}} w(i,j,t) * v(i,j,t)}{\underset{t=1}{\overset{T}{\text{SUM}}} w(i,j,t)} \quad \text{(Equation 1)}$$

where

| | |
|---|---|
| (i,j) | designates a grid position having null data value. |
| V(i,j) | is the interpolated value at (i,j). |
| T | is number of scan directions used in seeking nearby non-null neighbors of a point in the grid. |
| t | is index, value = 1...T, designating a scan direction outwards from position (i,j). |
| v(i,j,t) | is projected value at (i,j) computed from the scan outwards from (i,j) in the direction t. |
| w(i,j,t) | relative weight value, greater than or equal to zero, associated with v(i,j,t). |

Notation Definitions

Summarized here are notations used above and the text which follows:

| NOTATION | MEANING |
|---|---|
| i,j | are indexes locating points in a grid, |
| imin | is lowest value of i, |
| imax | is highest value of i, |
| jmin | is lowest value of j, |
| jmax | is highest value of j, |
| d(i,j) | denotes a data value at grid location (i,j), |
| dnull | is a special (impossible) data value indicating a null, |
| T | is number of scan angles used in seeking nearby non-null neighbors of a point in the grid, |
| t | is index, value = 1...T, designating a scan angle, |
| theta | is an angle in (i,j) index space, measured from the positive i direction towards the positive j direction, |
| theta(t) | scan angle associated with index t, |
| V(i,j) | final interpolated value for location (i,j), |
| I(i,j,t) | i index of nearest valid neighbor to point (i,j) in scan direction t, |
| J(i,j,t) | j index of nearest valid neighbor to point (i,j) in scan direction t, |
| D(i,j,t) | is data value of nearest valid data point in scan direction t = d (I(i,j,t), J(i,j,t)), |

-continued

| NOTATION | MEANING |
|---|---|
| r(i,j,t) | is distance from (i,j) to nearest valid data point in scan direction t, = sqrt ( (I(i,j,t) − i)2 + (J(i,j,t) − j)2 ), |
| gi(i,j) | is i component of data values gradient field at (i,j), |
| gj(I,j) | is j component of data values gradient field at (i,j), |
| v(I,j,t) | contribution to V(i,j) associated with results of scan in direction t from point (i,j), |
| w(i,j,t) | is relative weight value to be associated with v(i,j,t), |
| w(i,j) | is summation over t of w(i,j,t). |

Null-Point Based Approach to Implementation

The most direct implementation of Equation 1 and which forms the prior art is described by the following flow chart of a computer program of stored computer steps. In this program the outermost processing layers (Steps 1,2,3 and Steps 13, 14) are devoted to finding each grid point having null data value. For this reason such an implementation is called "null-point based". The innermost-processing layers (Steps 4, 5, 12) determine the complete interpolation at a single null position.

PROGRAM 1: Null-Point Based Radial Scan Interpolation

| STEP 1 | Set j = jmin |
|---|---|
| STEP 2 | Set I = Imin |
| STEP 3 | if d(i,j) is valid, i.e., d(i,j) not equal to dnull, no interpolation is needed here, so Skip to STEP 13. Otherwise interpolation is needed. |
| STEP 4 | Set SumWV = zero. Set SumW = zero. Set t = 1 |
| STEP 5 | Scan outwards from point i,j in direction t for valid data point. If no valid data point found, then skip to STEP 10. Otherwise, valid data D was found at grid point (I,J). |
| STEP 6 | If gradient assumed zero, then Go to STEP 7A. Otherwise go to Step 7B. |
| STEP 7A | Set v(i,j,t) = D. Go to STEP 8. |
| STEP 7B | Compute v(i,j,t) from i,j,D,I,J and knowledge of gradient. (See Section 7 for more details.) |
| STEP 8 | Compute radial distance r from point to neighbor r = sqrt ( (i − I)2 + (j − J)2 ) ) Set w(i,j,t) = 1/r or some other function of r |
| STEP 9 | Add w(i,j,t)*v(i,j,t) to SumWV Add w(i,j,t) to SumW |
| STEP 10 | Replace t by t + 1 If t <= T return to STEP 5 |
| STEP 11 | If SumW is still zero, then no interpolation is possible, so skip to STEP 13. Otherwise proceed to STEP 12. |
| STEP 12 | SET d(i,j) = SumWV/SumW |
| STEP 13 | Replace i by i + 1 If i <= imax Return to STEP 3 |
| STEP 14 | Replace j by j + 1 If j <= jmax Return to STEP 2 |

Patterns of Radial Scanning

Radial scanning outward from a null data point is, by the nature of (i,j) gridding, constrained to a limited number of natural directions. If theta is an angle in (i,j) space of such a natural direction then the exact opposition direction, i.e., theta +180 degrees, is also a natural direction. A selection of directions for scanning is called a radial scan "pattern", and within any reasonable pattern the directions will occur in pairs of opposites.

For illustration three such patterns, A,B,C are tabulated below, where natural directions and their opposites are grouped together by successive indexes t.

Pattern C, a 16-direction scan pattern, is included here primarily to show that radial scan patterns do not need to be limited to the obvious four directions or eight directions natural to (i,j) indexing. However directions higher than eight require multiphase scanning logic, a discussion of which would subtract more than it would add to the subsequent description of the invention.

SCAN PATTERN A-FOUR SCAN DIRECTIONS

| Index t | Scan description | Theta | Outwards scanning logic | |
|---|---|---|---|---|
| 1 | Right | 0.00 | i −> i + 1 | j −> j |
| 2 | Left | 180.00 | i −> i − 1 | j −> j + 1 |
| 3 | Up | 90.00 | i −> i | j −> j − 1 |
| 4 | Down | 270.00 | i −> i | |

SCAN PATTERN B-EIGHT SCAN DIRECTIONS

| Index t | Scan description | Theta | Outwards scanning logic | |
|---|---|---|---|---|
| 1 | Right | 0.00 | i −> i + 1 | j −> j |
| 2 | Left | 180.00 | i −> i − 1 | j −> j |
| 3 | RightUp | 45.00 | i −> i + 1 | j −> j + 1 |
| 4 | LeftDown | 225.00 | i −> i − 1 | j −> j − 1 |
| 5 | Up | 90.00 | i −> i | j −> j − 1 |
| 6 | Down | 270.00 | i −> i | j −> j − 1 |
| 7 | LeftUp | 135.00 | i −> i − 1 | j −> j + 1 |
| 8 | RightDown | 315.00 | i −> i + 1 | j −> j + 1 |

SCAN PATTERN C-SIXTEEN SCAN DIRECTIONS

| Index t | Scan description | Theta | Outwards | scanning logic |
|---|---|---|---|---|
| 1 | Right | 0.00 | i −> i + 1 | j −> j |
| 2 | Left | 180.00 | i −> i − 1 | j −> j |
| 3 | RightRightUp | 26.57 | Three phase: | |
| | | | i −> i + 1 | j −> j |
| | | | i −> i + 1 | j −> j |
| | | | i −> i | j −> j + 1 |
| 4 | LeftLeftDown | 206.57 | Three phase: | |
| | | | i −> −i − 1 | j −> j |
| | | | i −> −i − 1 | j −> j |
| | | | i −> −i | j −> j − 1 |
| 5 | RightUp | 45.00 | i −> i + 1 | j −> j + 1 |
| 6 | LeftDown | 225.00 | i −> i − 1 | j −> j − 1 |
| 7 | UpUpRight | 63.43 | Three phase: | |
| | | | i −> i | j −> j + 1 |
| | | | i −> i | j −> j + 1 |
| | | | i −> i + 1 | j −> j |
| 8 | DownDownLeft | 243.43 | Three phase: | |
| | | | i −> i | j −> j − 1 |
| | | | i −> i | j −> j − 1 |
| | | | i −> i − 1 | j −> j − 1 |
| 9 | Up | 90.00 | i −> i | j −> j + 1 |
| 10 | Down | 270.00 | i −> i | j −> j − 1 |
| 11 | UpUpLeft | 116.57 | Three phase: | |
| | | | i −> i | j −> j + 1 |
| | | | i −> i | j −> j + 1 |
| | | | i −> i − 1 | j −> j |
| 12 | DownDownRight | 296.57 | Three phase: | |
| | | | i −> i | j −> j − 1 |
| | | | i −> i | j −> j − 1 |
| | | | i −> i + 1 | j −> j |
| 13 | LeftUp | 135.00 | i −> i − 1 | j −> j + 1 |
| 14 | RightDown | 315.00 | i −> +1 | j −> j − 1 |
| 15 | LeftLeftUp | 153.43 | Three phase: | |
| | | | i −> i − 1 | j −> j |
| | | | i −> i − 1 | j −> j |
| | | | i −> i | j −> j + 1 |

-continued

SCAN PATTERN C-SIXTEEN SCAN DIRECTIONS

| Index t | Scan description | Theta | Outwards | scanning logic |
|---|---|---|---|---|
| 16 | RightRightDown | 333.43 | Three phase: | |
| | | | i -> i + 1 | j -> j |
| | | | i -> i + 1 | j -> j |
| | | | i -> i | j -> j − 1 |

Notes: 26.57 = arctangent (.5)
63.43 = arctangent (2.0)
116.57 = 90 + 26.57
153.43 = 90 + 63.43

Null Data Ranges and Their Importance

In the Section after this one the null-line based method of the invention is described. A computer program which incorporates the method is designed to search for linear ranges of contiguous nulls, and then to perform incremental interpolation of all points in such ranges.

To illustrate why a special treatment of these "null-lines" might be important, the following example is presented of data existing along a 45 degree line in the data, where dashes indicate null data.

$(i,j)$=(2,3) (3,4) (4,5) (5,6) (6,7)... ...(21,22) (22,23) (23,24)

$d(i,j)$=100 ------- ------- ------- -------... ...-------- --------- 200

In other words at (2,3) there is a data value of 100, at (23,24) there is a data value of 200, but all 20 intermediate positions along the 45 degree scan line are null. Now consider what happens under the null-point based algorithm for scan angle 45 degrees.

| When processing null data position at: | Number of scan tests required to reach valid data at (23,24) is: |
|---|---|
| i,j = (3,4) | 20 |
| i,j = (4,5) | 19 |
| i,j = (5,6) | 18 |
| . | . |
| . | . |
| . | . |
| i,j = (21,22) | 2 |
| i,j = (22,23) | 1 |
| | 210 total = 20*21/2 = (n*(n + 1) )/2 |

Likewise, when scanning in the opposite direction, 225 degrees, it will take another 210 tests to reach the valid data point at (2,3). A total of 420 tests, or more than the square of the number of nulls, will be made in processing these points just to locate nearest neighbors in the 45 and 225 degree directions.

On the other hand it should be possible to locate this 45 degree null line explicitly with just 21 tests, and then to know right away 1) that value 200 at (23, 24) is the 45 degree neighbor of each and every null point in the line, and
2) that value 100 at (2,3) is the 225 degree neighbor of each and every null point in the line.

This discovery provides the motivation for revamping the method to search first for linear null ranges in specified scan directions, and then to perform incremental interpolations (in the positive and negative directions along the nulls) at all positions in the line.

Null-Line Based Approach to Implementation

For the null-line based approach to radial scan interpolation Equation 1 is recast in a functionally equivalent form involving auxiliary numerator and denominator arrays $$V(i, j) = \frac{N(i, j)}{D(i, j)} \text{ where} \qquad \text{(Equation 2)}$$

$$N(i, j) = \text{SUM}_{t=1}^{T} w(i, j, t) * v(i, j, t) \qquad \text{(Equation 3)}$$

$$D(i, j) = \text{SUM}_{t=1}^{T} w(i, j, t) \qquad \text{(Equation 4)}$$

A null-line based implementation of the algorithm is described by the following conceptual program of computer steps. It is called Program 2 below. Involved are a few "prefix" steps, P1, P2, P3, P4, P5, to initialize the auxiliary arrays and a few "suffix" steps, S1, S2, S3, S4, S5, to extract the final interpolations using Equation 2.

In the main body of Program 2 the outermost processing layers (Steps 1,2,3 and Steps 8,9) are devoted to locating null data lines associated with pairs of scan directions. For this reason the implementation is called "null-line based". The innermost processing layers (Steps 4,5,6,7) increment the auxiliary arrays of Equations 3 and 4 for all points within such lines. The term "dataline" used in the Program 2 below denotes a line passing entirely through the data array at a particular scan angle. For theta (t)=0.0, the datalines would be all lines for which j=constant. For theta (t)=45.0, the datalines would be all lines for which, if (i,j) are the coordinates of one point, then (i+1,j+1) are the coordinates of the next point. For theta (t)=90.0, the datalines would be all lines for which i=constant. For theta (t)=135.0, the datalines would be all lines for which, if (i,j) are the coordinates of one point, then (i−1,j+1) are the coordinates of the next point.

Alternative programming techniques can be devised for locating all null data ranges without utilizing this dataline concept. The invention of the interpolation method based upon a null-line results in the speed advantage to be realized from processing the null-lines regardless of how they are found.

PROGRAM 2: A Null-Line Based Radial Scan Interpolation

PREFIX

| STEP P1 | Set j = jmin |
|---|---|
| STEP P2 | Set i = imin |
| STEP P3 | Set N(i,j) = zero, D(i,j) = zero |
| STEP P4 | i -> i + 1 If i <= imax return to Step P3 |
| STEP P5 | j -> j + 1 If j <= jmax return to Step P2 |

MAIN BODY

| STEP 1 | Set t = 1. |
|---|---|
| STEP 2 | Set for first dataline in direction t. |
| STEP 3 | Scan remaining part of selected dataline. If there is no remaining part, or if a null line was not found, skip to Step 8. |
| STEP 4 | If first point of null line was at the very beginning of the selected dataline, no projection in direction t can be made, so skip to Step 6. |
| STEP 5 | Increment N(i,j) and D(i,j) at every point of the null line for scan direction t, using non null value just before first null of the line as the projection basis point. |
| STEP 6 | If last point of null line was at the very end of the selected dataline, no projection in direction t + 1 can be made, so skip to Step 8. |

-continued

PROGRAM 2: A Null-Line Based Radial Scan Interpolation

| STEP 7 | Increment N(i,j) and D(i,j) at every point of the null line for scan direction t + 1, using non null value just beyond the last null of the line as the projection basis point. |
| STEP 8 | Prepare for next dataline in direction t. If no more such datalines exist, go to Step 9. Otherwise return to Step 3. |
| STEP 9 | Increment t by TWO. If t < T return to Step 2. Otherwise proceed to Suffix. |

SUFFIX

| STEP S1 | Set j = jmin |
| STEP S2 | Set i = imin |
| STEP S3 | If D(i,j) exceeds zero, set V(i,j) = N(i,j)/D(i,j) |
| STEP S4 | i -> i + 1 If i <= imax return to Step S3 |
| STEP S5 | j -> j + 1 If j <= jmax return to Step S2 |

Additional Processing Details

Efficient methods of scanning the data at the radial angles can be illustrated in the C programming language, where the data, conceptually a doubly subscripted array specifiable as (for example) float data [idim,jdim], where i=0 . . . imax, j=0 . . . jmax. may be alternatively referenced by an equivalenced, singly subscripted array float d[k], where k=0 . . . jmax*idim. Subscript transformations are k=i+j*idim, and j=k/idim, i=k−j*idim, where division implies truncation.

For any scan direction in Pattern A or B a k increment can be picked up from the table

| Scan angle | 0 | 45 | 90 | 135 | 180 | 225 | 270 | 315 |
|---|---|---|---|---|---|---|---|---|
| kinc | 1 | idim + 1 | idim | idim − 1 | −1 | −idim − 1 | −idim | −idim + 1 |

Now suppose
  kfrst locates the first null in a line of R consecutive nulls in some scan direction
  dbasis=d[kfrst-kinc] is the basis value for projection.
  wgts[r] is a precomputed weighting function for this direction.
Then a very simple loop for (k=kfrst,r=1; r<=R; r++,k+=kinc) {w=wgts[r]; d[k]+=w; N[k]+=w*dbasis;} would increment the numerator and denominator arrays (Equations 3 and 4) for all R points along the line for the given scan direction in the case of zero gradient assumption. An almost identical loop could then be used to increment the arrays for the opposite scan direction.

For a non-zero gradient, the projected value along the line would not be a constant, dbasis, but would vary linearly according to the directional derivative in the scan direction. At the grid point for dbasis, suppose that gi and gj are the gradient components in the i and j directions, and suppose that ui and uj are components of a unit vector in the scan direction. Then the directional derivative is the dot product dd=gi*ui+gj*uj and the projected value increases by dd times the magnitude of the incremental distance as k increases by kinc. Suppose this increment is computed and call it dinc. The loop now should look like for (d=dbasis+dinc, k=kfrst,r=1; r<=R; r++,k+=kinc,d+=dinc) {w=wgts [r]; D[k]+=w; N[k]+=w*d;} and should be nearly as fast as the zero-gradient loop. As before, an almost identical loop could then be used to increment the arrays for the opposition scan direction.

Advantages of Null-Line Based Radial Scan Interpolation

The invention described above is called "null-line based radial scan interpolation" and is also called "Spatial Interpolation". The method is superior to standard, or "null-point based radial scan interpolation" (also called "linear interpolation") in many real data situations from the standpoint of computational time.

The null-line and the null-point approaches to implementing radial scan interpolation produce identical numerical results (within roundoff error). The practical, and important, difference is in the amount of time the computations take. This depends on the nature of the data.

For data with a very small number of null points at which interpolation must be made, the computation time is probably not much of a consideration whichever approach is taken.

But for data with many null points, tending to be contiguous to each other so that the average length of null line is sizeable, then the null-line approach produces much faster processing times, since its processing of such lines requires time proportional to this average length, whereas the null-point approach requires time having a component proportional to the square of average length. Both approaches have been implemented in software attached hereto as a Compact Disk for radial scan patterns A and B described above. Experimental application of this software to seismic horizon data has born out the theoretical predictions, with null-line based software showing speed advantages by factors of four or more on large data sets involving millions of interpolations. The null-line based radial scan interpolation should provide savings in costs due to decreased computation times.

Applications of this software to seismic horizon data are illustrated above. The description presented describes additional computational complications related to fault polygons, boundary polygons, varieties of gradient specification, and post-interpolation smoothing filtering, all of which are treated in both the null-point and the null-line codes.

What is claimed is:

1. A method for processing geologic horizon data values collecting seismic signals from a geologic formation of the earth, creating said geologic horizon data values from said seismic signals by arranging said data values in a data array at equally spaced locations in two dimensions with nulls in the data array, searching for linear ranges of contiguous nulls, said searching including the step of locating null data lines associated with pairs of scan directions, wherein a data line is a line passing entirely through the data array at a particular scan angle, and wherein each located null data line is characterized by a set of indices i,j through said data array and interpolated values of points on a data line are determined by, $$V(i, j) = \frac{\underset{t=1}{\overset{T=2}{\text{SUM}}} w(i, j, t) * v(i, j, t)}{\underset{t=1}{\overset{T}{\text{SUM}}} w(i, j, t)}$$

for all points within said located null lines where,
(i,j) designates a grid position having null data value;

V(i,j) is the interpolated value at (i,j);

T=2 is the number 2 of scan directions used in seeking nearby non-null neighbors of a point in the grid;

t is the index, value=1 . . . 2, designating a scan direction theta outwards from position (i,j);

theta is an angle in (i,j) index space, measured from the positive i direction towards the positive j direction;

V(i,j,t) is projected value at (i,j) computed from the scan outwards from (i,j) in the direction t; and, w(i,j,t) is the relative weight value, greater than or equal to zero, associated with V v(i,j,t) and performing incremental interpolation of all points in such ranges, and plotting said data in said two dimensions to produce a representation of said horizon data with interpolation data replacing said nulls in said data array.

* * * * *